(12) United States Patent
Kim et al.

(10) Patent No.: US 7,969,944 B2
(45) Date of Patent: *Jun. 28, 2011

(54) HAND OVER METHOD FOR DUAL BAND/DUAL MODE MOBILE COMMUNICATION TERMINAL

(75) Inventors: Young-Lak Kim, Gyeonggi-do (KR); Sung-Ho Shin, Seoul (KR); Hyun-Wook Kim, Gyeonggi-do (KR); Jong-Tae Ihm, Gyeonggi-do (KR)

(73) Assignee: SK Telecom Co., Ltd., Seoul (KR)

( * ) Notice: Subject to any disclaimer, the term of this patent is extended or adjusted under 35 U.S.C. 154(b) by 938 days.

This patent is subject to a terminal disclaimer.

(21) Appl. No.: 11/576,849

(22) PCT Filed: Jan. 4, 2005

(86) PCT No.: PCT/KR2005/000009
§ 371 (c)(1),
(2), (4) Date: Oct. 2, 2007

(87) PCT Pub. No.: WO2006/073209
PCT Pub. Date: Jul. 13, 2006

(65) Prior Publication Data
US 2008/0037470 A1   Feb. 14, 2008

(51) Int. Cl.
*H04W 4/00* (2009.01)
*H04W 36/00* (2009.01)
*H04M 1/00* (2006.01)

(52) U.S. Cl. .............. 370/331; 455/432.1; 455/435.2; 455/436; 455/552.1

(58) Field of Classification Search .......... 455/432.1, 455/435.2, 436, 552.1, 553.1; 370/331, 328
See application file for complete search history.

(56) References Cited

U.S. PATENT DOCUMENTS

| 6,704,581 | B1 | 3/2004 | Park et al. | |
|---|---|---|---|---|
| 7,864,730 | B2 * | 1/2011 | Kim et al. | 370/331 |
| 2002/0071404 | A1 | 6/2002 | Park et al. | |
| 2003/0224791 | A1 * | 12/2003 | Choi et al. | 455/436 |
| 2005/0043046 | A1 * | 2/2005 | Lee | 455/502 |
| 2008/0056190 | A1 * | 3/2008 | Kim | 370/331 |

FOREIGN PATENT DOCUMENTS

| JP | 2001-186552 | 7/2001 |
|---|---|---|
| JP | 2001-224052 | 8/2001 |
| JP | 2004-328135 | 11/2004 |
| KR | 10-2001-0056283 | 7/2001 |
| WO | 2004/091244 | 10/2004 |

* cited by examiner

*Primary Examiner* — Un C Cho
(74) *Attorney, Agent, or Firm* — Lowe Hauptman Ham & Berner LLP

(57) ABSTRACT

The handover method includes the steps of the base stations of the synchronous mobile communication network transmitting dummy pilot signals for the asynchronous mobile communication network, the mobile communication terminal, for which call connection with the asynchronous mobile communication network is performed through the asynchronous wireless device, determining whether the dummy pilot signals for the asynchronous mobile communication network have been received through the asynchronous wireless device; the mobile communication terminal requesting handover from the asynchronous mobile communication network if it is determined that the dummy pilot signals for the asynchronous mobile communication network have been received; and the asynchronous mobile communication network determining that handover is possible, notifying the mobile communication terminal of the determination that handover is possible, and the asynchronous mobile communication network requesting handover to the synchronous mobile communication network, thus performing handover.

9 Claims, 6 Drawing Sheets

HAND OVER METHOD FOR DUAL BAND/DUAL MODE MOBILE COMMUNICATION TERMINAL

CROSS REFERENCE TO RELATED APPLICATION

This application is the National Phase application of International Application No. PCT/KR2005/000009, filed Jan. 4, 2005, which designates the United States and was published in English. This application, in its entirety, is incorporated herein by reference.

TECHNICAL FIELD

The present invention relates, in general, to a handover method for a dual band/dual mode mobile communication terminal and, more particularly, to a handover method for a dual band/dual mode mobile communication terminal, which enables uninterrupted handover between a synchronous mobile communication network and an asynchronous mobile communication network.

BACKGROUND ART

Current mobile communication service technology can be classified into asynchronous service, which is based in Europe, and synchronous service, which is based on North America. Furthermore, International Mobile Telecommunications (IMT)-2000 service, which is a new mobile communication technology standard for transferring packets at high speed, is being developed separately for use in North America and in Europe.

Synchronous IMT-2000 service (a synchronous mobile communication network) is being developed in the form of Code Division Multiple Access (CDMA) 2000 1x service, and CDMA2000 1x Evolution Data Optimized (EV-DO) EV-DO service, and Asynchronous IMT-2000 service (an asynchronous mobile communication network) is being developed in the form of Wideband Code Division Multiple Access (WCDMA) Universal Mobile Telecommunications System (UMTS) service. In these environments, the problem of roaming between a synchronous network and an asynchronous network becomes the greatest issue and, accordingly, a dual band/dual mode terminal has been developed so as to enable uninterrupted roaming between the synchronous mobile communication network and the asynchronous mobile communication network.

The asynchronous mobile communication network is being constructed for regions having great demand for service and, therefore, the synchronous mobile communication network is evolving such that the service area thereof includes the service areas of an asynchronous network. In such a process, handover between the networks is necessary to provide continuous service in the case where a user moves between the asynchronous mobile communication system and the synchronous mobile communication system.

Currently, both synchronous and asynchronous wireless devices, which are provided in a dual band/dual mode mobile communication terminal, are activated when handover is performed between the asynchronous mobile communication system and the synchronous mobile communication system. Thereafter, when the mobile communication terminal moves to the synchronous mobile communication network while communicating via the asynchronous mobile communication network, a signal from the synchronous mobile communication network is detected using the synchronous wireless device and handover is performed.

As a result, problems occur in that when only one wireless device is activated, a signal from the other type of mobile communication network is not detected, and therefore the success rate of handover is reduced. When the mobile communication terminal operates in the state in which the different wireless devices have been activated for the handover, power is excessively consumed, and therefore the lifespan of the battery is shortened.

DISCLOSURE OF THE INVENTION

Accordingly, the present invention has been made keeping in mind the above problems occurring in the prior art, and an object of the present invention is to provide a handover method for a dual band/dual mode mobile communication terminal, which enables uninterrupted handover between a synchronous mobile communication network and an asynchronous mobile communication network while reducing power consumption.

BEST MODE FOR CARRYING OUT THE INVENTION

Figure 1:
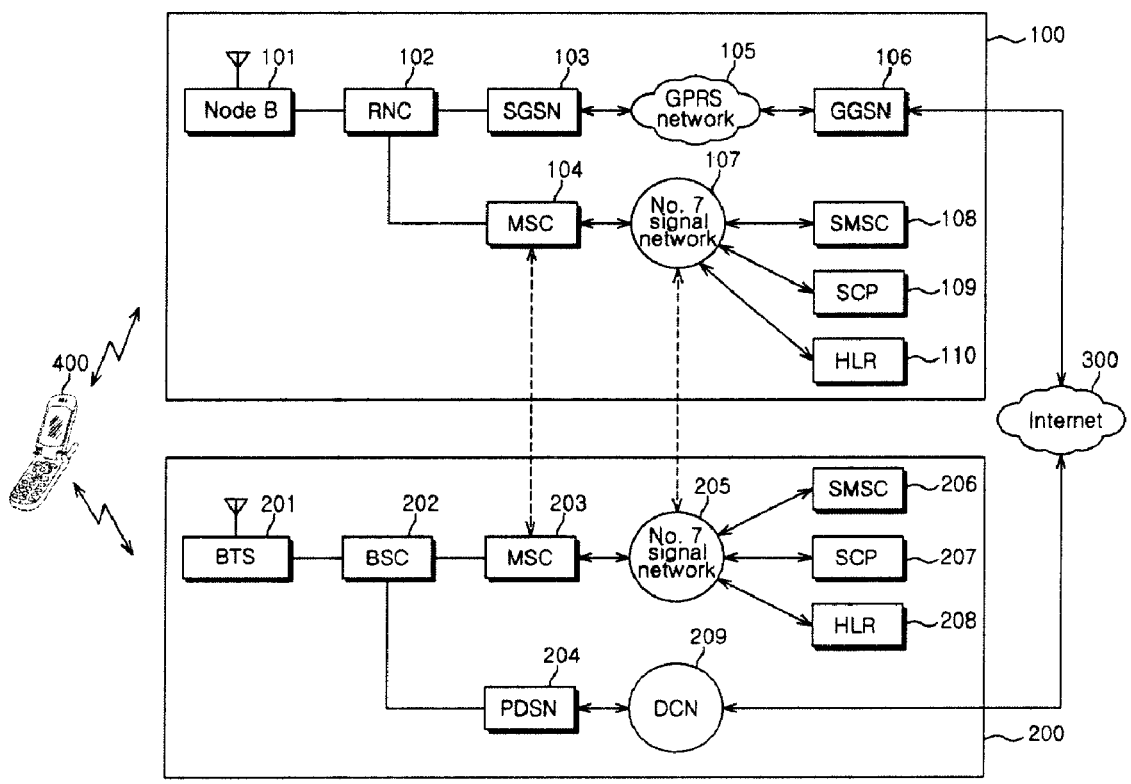
FIG. 1 is a block diagram illustrating a connection between a mobile communication terminal and mobile communication networks according to the present invention.

In order to accomplish the above object, the present invention provides a handover method for a dual band/dual mode mobile communication terminal in a mobile communication network in which an asynchronous mobile communication network and synchronous mobile communication network overlap, the terminal including an asynchronous wireless device for performing asynchronous communication with the asynchronous mobile communication network, a synchronous wireless device for performing synchronous communication with the synchronous mobile communication network and a common module for performing control when wireless communication is performed with the synchronous mobile communication network through the synchronous wireless device and asynchronous mobile communication network through the asynchronous wireless device, the handover method including the first step of the base stations of the synchronous mobile communication network transmitting dummy pilot signals for the asynchronous mobile communication network, and the mobile communication in, for which call connection with the asynchronous mobile communication network is performed through the asynchronous wireless device, determining whether the dummy pilot signals for the asynchronous mobile communication network, which have been transmitted from the base stations of the synchronous mobile communication network, have been received through the asynchronous wireless device; the second step of the mobile communication terminal requesting handover to the asynchronous mobile communication network if, at the first step, it is determined that the dummy pilot signals for the asynchronous mobile communication network have been received; and the third step of the asynchronous mobile communication network determining that handover is possible, notifying the mobile communication terminal of the determination that handover is possible, and the asynchronous mobile communication network requesting handover to the synchronous mobile communication network, thus performing handover, in response to the handover request at the second step.

In addition, the present invention provides a handover method for a dual band/dual mode mobile communication terminal in a mobile communication network in which an asynchronous mobile communication network and a synchronous mobile communication network overlap, the terminal including an asynchronous wireless device for performing asynchronous communication with the asynchronous mobile communication network, a synchronous wireless device for performing synchronous communication with the synchronous mobile communication network, and a common module for performing control when wireless communication is performed with the synchronous mobile communication network through the synchronous wireless device and asynchronous mobile communication network through the asynchronous wireless device, the handover method including the first step of the base stations of the synchronous mobile communication network, which includes a boundary area between the asynchronous mobile communication network and the synchronous mobile communication network, transmitting dummy pilot signals for the asynchronous mobile communication network; the second step of the asynchronous mobile communication network receiving a handover request from the mobile communication terminal receiving the dummy pilot signals; the third step of the core network of the asynchronous mobile communication network determining that handover is possible and notifying the mobile communication terminal of the determination that handover is possible in response to the handover request; the fourth step of the asynchronous mobile communication network requesting and receiving information about the base stations of the synchronous mobile communication network with respect to the dummy pilot signals from the mobile communication terminal; the fifth step of the asynchronous mobile communication network transmitting a handover request message, including the information about the base stations of the synchronous mobile communication network, to the synchronous mobile communication network; and the sixth step of the asynchronous mobile communication network and the synchronous mobile communication network performing handover in response to the handover request message.

The present invention is described in detail with reference to the accompanying drawings below.

FIG. 1 is a block diagram illustrating the construction of a synchronous mobile communication network and an asynchronous mobile communication network according to the present invention.

Referring to FIG. 1, the asynchronous mobile communication network (WCDMA network) 100 includes a Node B 101 for wireless communication with a mobile communication terminal 400, a Radio Network Controller (hereinafter referred to as an "RNC") 102 for controlling the Node B 101, a Serving GPRS Service Node (hereinafter referred to as an "SGSN") 103 connected to the RNC 102 to manage the mobility of the mobile communication terminal 400, and an asynchronous communication network data service gateway node (hereinafter referred to as a "Gateway GPRS Supporting Node (GGSN)") 106, which is a relay device for performing packet service control and packet data transmission through a General Packet Radio Service (GPRS) network 105.

Furthermore, a Mobile Switching Center (hereinafter, refereed to as an "MSC") 104 for performing call exchange 104 is connected to the RNC 102, and the MSC 104 is connected to a No. 7 signal network 107 for exchanging signals. A Short Message Service Center (hereinafter refereed to as an "SMSC") 108 for providing short message service, an intelligent network controller hereinafter, referred to as a "Service Control Point (SCP)") 109, and a Home Location Register (hereinafter referred to as an "HLR") 110 for managing information about subscribers' locations are connected to the No. 7 signal network 107.

Meanwhile, a synchronous mobile communication network (CDMA 2000 network) 200 includes a base station (hereinafter referred to as a "Base Transceiver System (BTS)") 201 for communicating with the mobile communication terminal 400, a Base Station Controller (hereinafter referred to as a "BSC") 202 for controlling the BTS 201, a Packet Data Service Node hereinafter referred to as a "PDSN") 204 connected to the BSC 202 to provide packet data service, a Data Core Network (hereinafter referred to as a "DCN") 209 connected to the PDSN 204 to provide Internet connection service, and a Mobile Switching Center (hereinafter referred to as "MSC") 203 connected to the BSC 202 to perform call switching.

The MSC 203 is connected to a No. 7 signal network 205 for exchanging signals. A Short Message Service Center hereinafter referred to as an "SMSC") 206 for providing short message service, an intelligent network controller (hereinafter referred to as a "Service Control Point (SCP)") 207, and a Home Lotion Register (hereinafter referred to as an "HLR") 208 for managing information about subscribers' locations are connected to the No. 7 signal network 205.

The MSCS 104 and 203 of the asynchronous and synchronous mobile communication network 100 and 200 are connected to each other, and the No. 7 signal networks 107 and 205 are also connected to each other so that information necessary for the handover of the mobile communication terminal 400 can be transmitted and received.

Furthermore, although in the present embodiment the asynchronous and synchronous mobile communication network 100 and 200 include the HLRs 110 and 208 for managing information about subscribers and the subscribers' locations respectively, the asynchronous and synchronous mobile communication networks 100 and 200 may share the information about subscribers and the subscribers' location with each other using a single HLR (a dual stack HLR).

Figure 2:
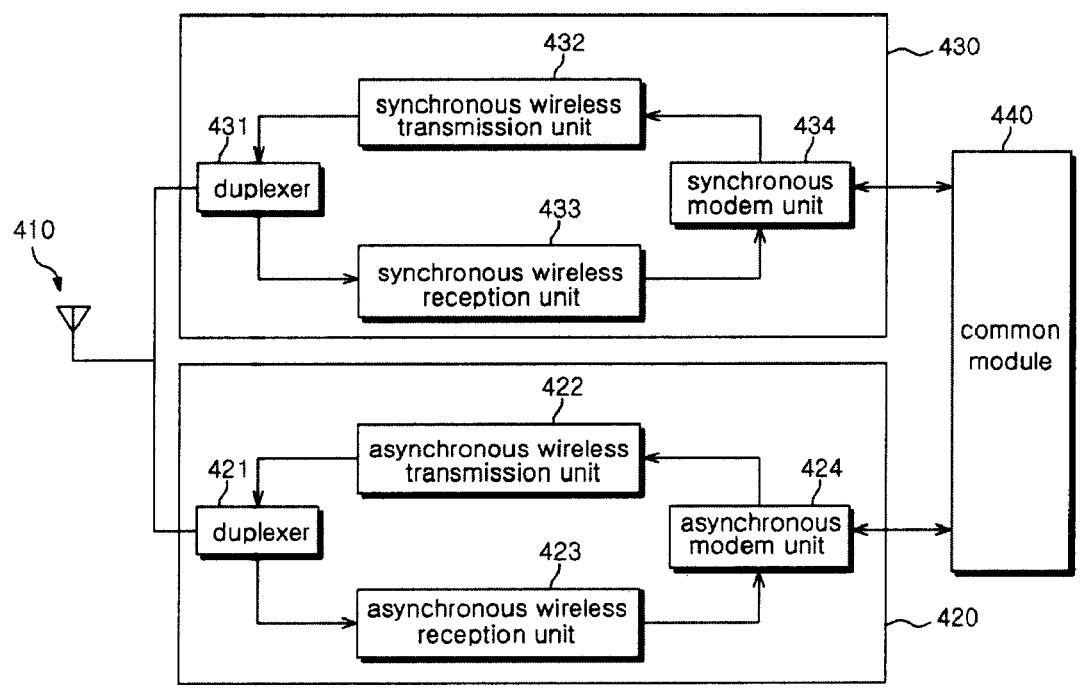
FIG. 2 is a block diagram illustrating the construction of the mobile communication terminal according to the present invention.

FIG. 2 is a block diagram illustrating the construction of the mobile communication terminal according to the present invention.

Referring to FIG. 2, the dual band mobile communication terminal 400 according to the present invention supports both synchronous mobile communication and asynchronous mobile communication, and has respective stacks for corresponding protocols.

The mobile communication terminal 400 according to the present invention includes an antenna 410 for transmitting and receiving radio waves to and from the synchronous mobile communication network 200 and the asynchronous mobile communication network 100, a synchronous wireless device 430 for performing synchronous communication, an asynchronous wireless device 420 for performing asynchronous communication, and a common module 440 for providing common resources when synchronous and asynchronous communication are performed.

The synchronous wireless device 430 includes a synchronous wireless transmission unit 432 for performing wireless transmission, a synchronous wireless reception unit 433 for performing wireless reception, and a synchronous modem unit 434. One side of each of the synchronous wireless transmission unit 432 and the synchronous wireless reception unit 433 is connected to the antenna 410 via a duplexer 431, and the other side of each of the synchronous wireless transmission unit 432 and the synchronous wireless reception unit 433 is connected to the synchronous modem unit 434.

Furthermore, the asynchronous wireless device 420 includes an asynchronous wireless transmission unit 422 for performing wireless transmission, an asynchronous wireless reception unit 423 for performing wireless reception, and an asynchronous modem unit 424. One side of each of the asynchronous wireless transmission unit 422 and the asynchronous wireless reception unit 423 is connected to the antenna 410 via a duplexer 421, and the other side of each of the asynchronous wireless transmission unit 422 and the asynchronous wireless reception unit 423 is connected to the asynchronous modem unit 424.

The common module 440 operates as a Central Processing Unit (CPU) for controlling the synchronous modem unit 434 and the asynchronous modem unit 424, and includes application processors performing multimedia function, memory, an input/output unit, and other application processing units, the detailed construction of which is described below.

Figure 3:
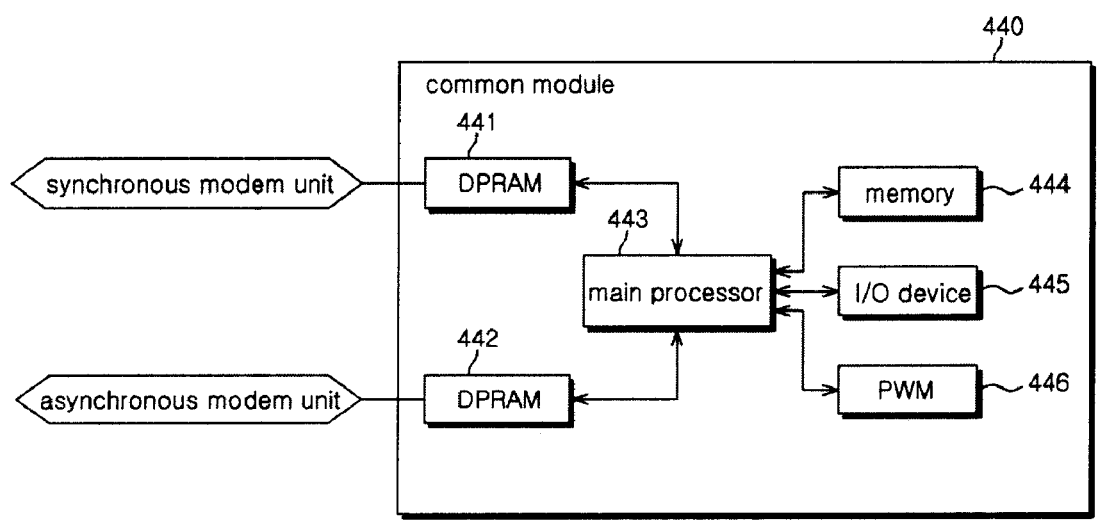
FIG. 3 is a block diagram illustrating the construction of the common module according to the present invention.

FIG. 3 is a block diagram illustrating the construction of the common module according to the present invention.

Referring to FIG. 3, the common module 440 of the mobile communication terminal according to the present invention includes a plurality of Dual Port Random Access Memories (RAMs) (hereinafter "DPRAMs") 441 and 442 connected to the modem units 424 and 434 of the asynchronous and synchronous wireless device 420 and 430, respectively, and a main processor 443 connected with the DPRAMs 441 and 442 and configured to perform the overall control of the synchronous and asynchronous communication of the mobile communication terminal 400 and the running of applications. Memory 444 for storing data, an I/O device 445 for connecting peripheral devices, and a Power Control Module (hereinafter referred to as a "PWM") 446 for controlling power are connected to the main processor 443.

The common module 440, constructed as described above, is provided with software to provide a user interface, supplementary service, mobility management, connection/session control, resource control, and protocol processing, so that it allows a user to use various application services. Furthermore, the common module 440 performs handover, and performs protocol conversion to be suitable for a mobile communication system.

Figure 4:
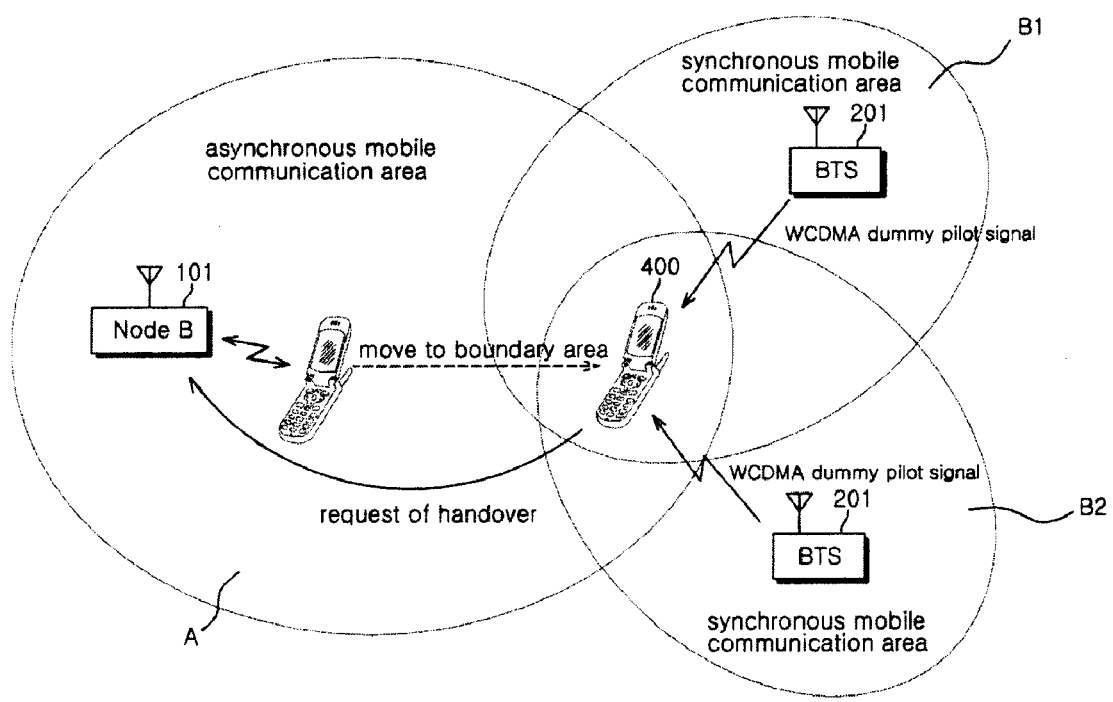
FIG. 4 is a diagram schematically illustrating handover in a mobile communication network in which asynchronous and synchronous networks overlap according to the embodiment of the present invention.

FIG. 4 is a diagram schematically illustrating handover in a mobile communication network in which asynchronous and synchronous networks overlap according to the embodiment of the present invention.

In the embodiment of the present invention, the mobile communication terminal 400 can search for the synchronous mobile communication network 200 while communicating via the asynchronous mobile communication network 100. That is, the mobile communication terminal 400 can detect the intensity of signals received from the BTSs 201 of the synchronous mobile communication network 200 and report the detection results to the asynchronous mobile communication network 100.

The above-described mobile communication terminal 400 includes the asynchronous wireless device 420 and the synchronous wireless device 430. Only the asynchronous wireless device 420 is in an activated state when the mobile communication terminal 400 is performing communication through the asynchronous mobile communication network 100, so that it is difficult to detect signals transmitted from the BTSs 201 of the synchronous mobile communication network 200.

To this end, in the present embodiment, the BTSs 201 of the synchronous mobile communication network 200, which includes a boundary area between the asynchronous mobile communication network 100 and the synchronous mobile communication network 200, transmit pilot signals (WCDMA pilot signals) of the asynchronous mobile communication network. Furthermore, the mobile communication terminal 400 receives the WCDMA pilot signals, which are transmitted from the BTSs 201 of the synchronous mobile communication network 200 that includes the boundary area, through the asynchronous wireless device 420 and, therefore, determines that it is currently located in the boundary area between the asynchronous mobile communication network 100 and the synchronous mobile communication network 200, and performs handover.

Referring to FIG. 4, all of BTSs 201 located in the areas "B1" and "B2" of the synchronous mobile communication network 200, which overlaps the area "A" of the asynchronous mobile communication network 100, transmit the pilot signals (WCDMA pilot signals) of the asynchronous mobile communication network.

Accordingly, when the mobile communication terminal 400 moves to an area bordering on the synchronous mobile communication network 200 while performing communication in area "A" of the asynchronous mobile communication network 100 while communicating with the Node B 101, the mobile communication terminal 400 receives the WCDMA pilot signals of the asynchronous wireless device 420, which are respectively transmitted from the BTSs 201 of the synchronous mobile communication network that includes the boundary area. Subsequently, the mobile communication terminal 400 determines that it is currently located in the boundary area between the asynchronous mobile communication network 100 and the synchronous mobile communication network 200, and requests handover from the Node B 101 of the asynchronous mobile communication network 100.

The handover method according to the above-described process is described in detail below.

Figure 5A:
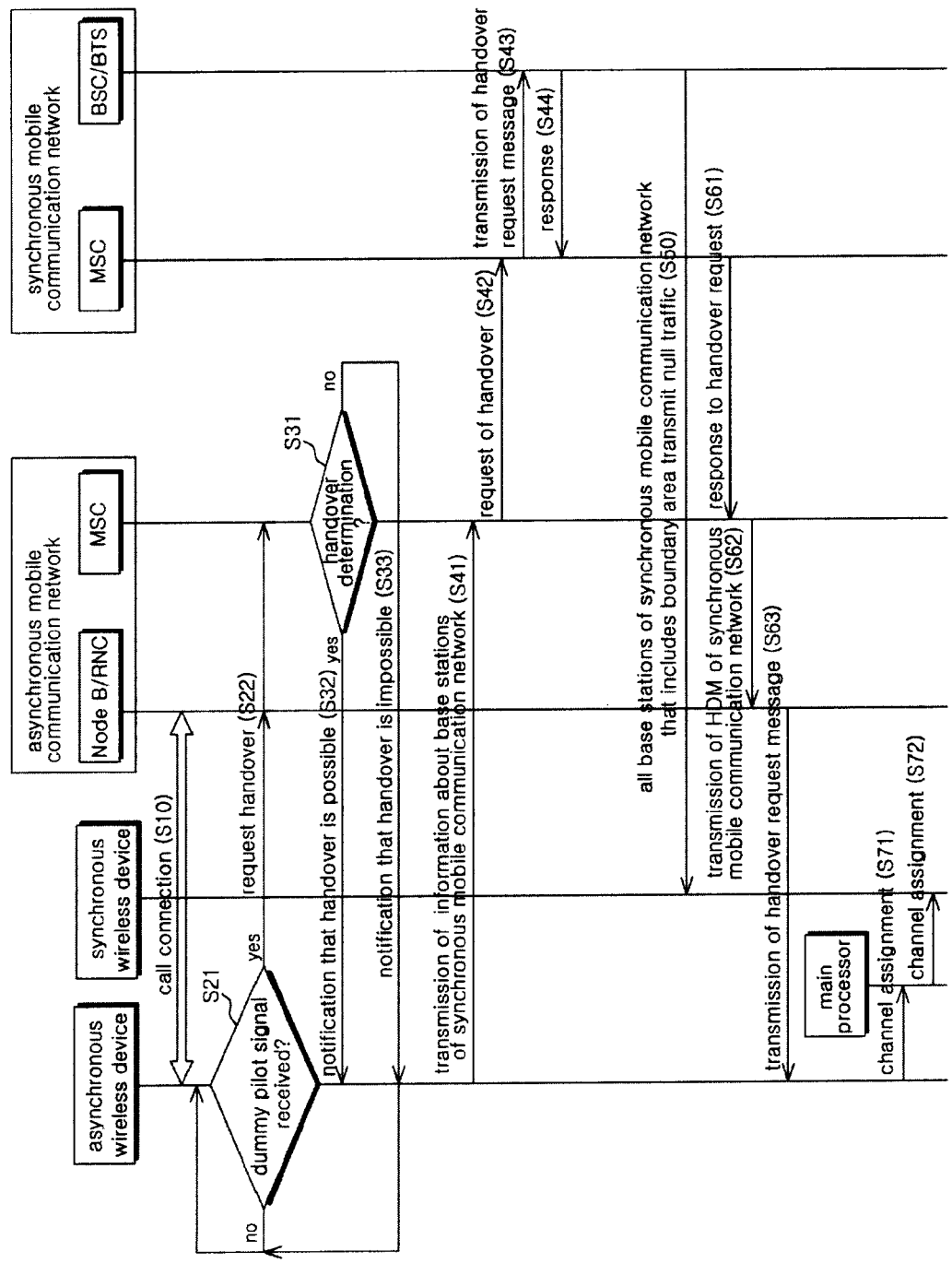
FIGS. 5A and 5B are flowcharts illustrating a handover process of the mobile communication terminal according to the present invention.
Figure 5B:
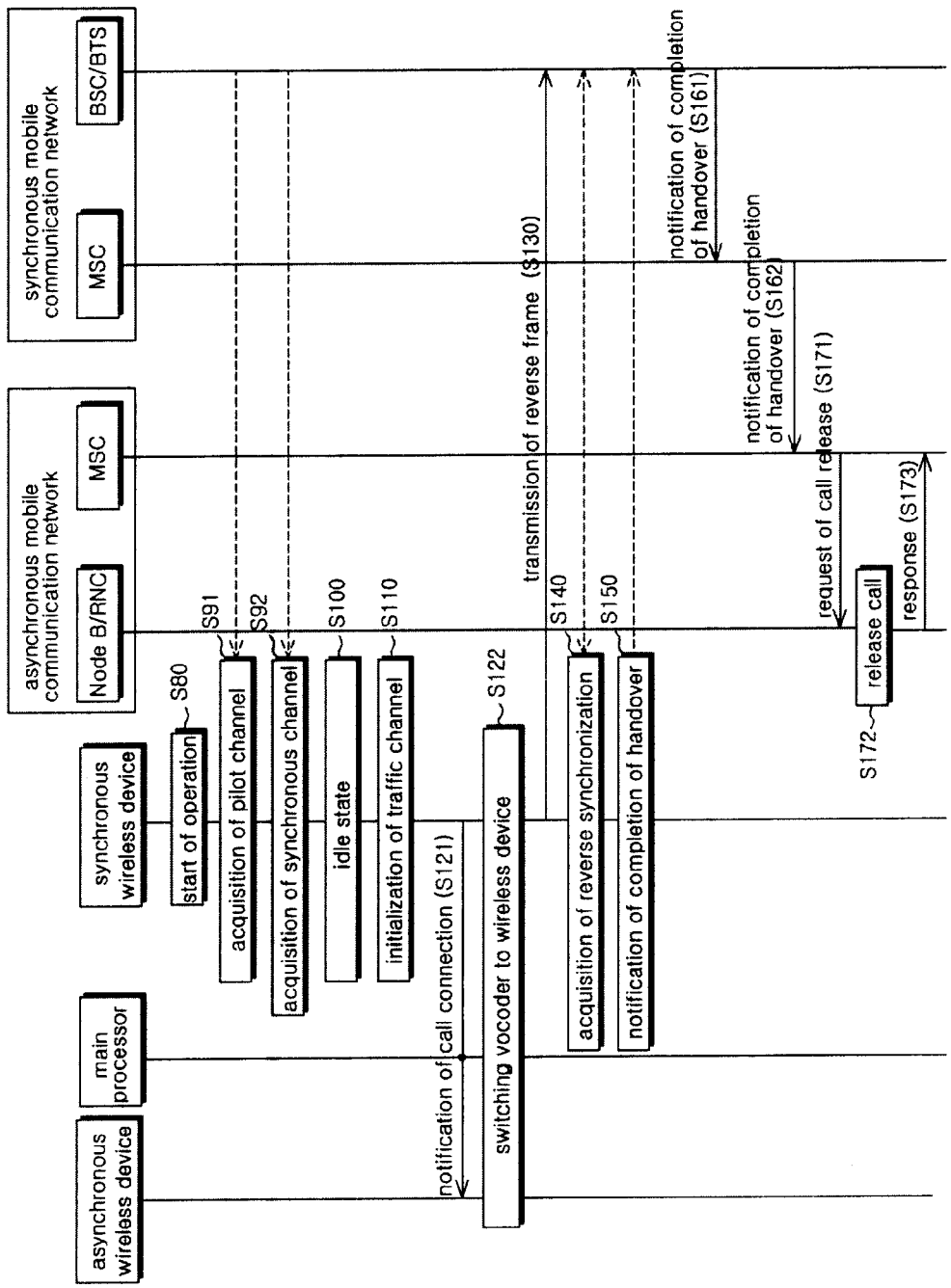

FIGS. 5A and 5B are a flowchart illustrating the handover method of the mobile communication terminal according to an embodiment of the present invention.

Referring to FIGS. 5A and 5B, when the mobile communication terminal 400 is connected to the asynchronous mobile communication network 100 through the asynchronous wireless device 420 of the mobile communication terminal 400 and performs communication at step S10, the asynchronous modem unit 424 of the mobile communication terminal 400 determines whether WCDMA dummy pilot signals, which are transmitted from the BTSs 201 of the synchronous mobile communication network 200 through the asynchronous wireless device 420, are received at step S21. In this case, the WCDMA dummy pilot signals include information about the base stations of the BTSs 201.

If, at step S21, it is determined that the WCDMA dummy pilot signals have been received, the asynchronous wireless device 420 recognizes that the mobile communication terminal 400 is currently located in a boundary area, and requests handover to the asynchronous mobile communication network 100 at step S22.

Accordingly, the MSC 104 of the asynchronous mobile communication network 100 determines whether handover is possible at step S31. If it is determined that handover is impossible, the MSC 104 notifies the mobile communication terminal of the determination that handover is impossible at step S33. However, if at step S31, it is determined that handover is possible (i.e. that a predetermined condition are satisfied), the MSC 104 notifies the asynchronous wireless device 420 of the mobile communication terminal 400 of the determination that handover is possible at step S32.

The asynchronous wireless device 420 of the mobile communication terminal 400 transmits the information about the base stations of the BTSs 201, which is contained in the WCDMA dummy pilot signals, to the MSC 104 at step S41.

After step S41, the asynchronous mobile communication network 100 requests handover of the mobile communication terminal 400 to the MSC 203 of the synchronous mobile communication network 200 (Relocation Required) at step S42. The Identification (ID) number of the mobile communication terminal 400 is transmitted during this handover request, and handover is requested using a Mobile Application Part (MAP) message defined in IS-41.

Accordingly, the MSC 203 transmits a message for requesting handover to the BSC/BTS (Handoff Request) at step S43, and the BSC/BTS transmits a response signal to the MSC 203 (Handoff Req Ack) at step S44.

Thereafter, all of the BTSs of the synchronous mobile communication network 200, which includes the boundary area, transmit null traffic to the synchronous wireless device 430 of the mobile communication terminal 400 through a Forward Fundamental Channel (F-FCH) for transmitting forward traffic (null F-FCH frames) at step S50. Accordingly, a forward channel is assigned to the synchronous wireless device 430 of the mobile communication terminal 400.

When preparation for handover is completed in the synchronous mobile communication network 200 as described above, the MSC 203 of the synchronous mobile communication network 200 transmits a signal, responding to the request at step S42, to the asynchronous mobile communication network 100 (facdir2, Relocation Command) at step S61.

Thereafter, the asynchronous mobile communication network 100 transmits a handover request message to the asynchronous wireless device 420 of the mobile communication terminal 400 through the Node B/RNC at steps S62 and S63. The handover request message includes messages related to the synchronous mobile communication network and, in particular, includes a Handoff Direction Message (HDM) having information about channel assignment.

Accordingly, the asynchronous wireless device 420 makes a request through the main processor 443 at step S71, and the main processor 443 assigns channels to the synchronous wireless device 430 (channel assignment) at step S72.

Thereafter, the synchronous modem unit 434 of the synchronous wireless device 430 starts operation through switch-on and warm-up processes at step S80, so that a pilot channel is acquired at step S91 and a synchronous channel is acquired at step S92. By acquiring the pilot channel, synchronization between the BTS/BSCs of the synchronous mobile communication network 200 and the mobile communication terminal 400 is performed. By acquiring the synchronous channel, timing information and some other system information are received from the BTS/BSC.

Accordingly, the synchronous wireless device 430 of the mobile communication terminal 400 is in an idle state at step S100, initializes the traffic channel thereof at step S110 and, thereby, enters into a traffic state, so that connection with the synchronous mobile communication network 200 is performed.

When the process of preparing communication is completed as described above, the synchronous wireless device 430 notifies the asynchronous wireless device 420 of a call connection through the main process 443 (call connected) at step S121. Thereafter, the vocoder switches to the synchronous wireless device 430 at step S122.

Accordingly, a mode change between the asynchronous and synchronous wireless devices 420 and 430 of the mobile communication terminal 400 is completed, the synchronous wireless device 430 transmits frames to the BTS/BSC of the synchronous mobile communication terminal 200 through a Reverse Fundamental Channel (R-FCH) (R-FCH frames) at step S130, and the mobile communication terminal 400 acquires reverse synchronization at step S140, so that a connection is made between the mobile communication terminal 400 and the synchronous mobile communication network 200, and the synchronous wireless device 430 of the mobile communication terminal 400 notifies the synchronous mobile communication network 200 of the completion of handover at step S150.

Thereafter, the BTS/BSC notifies the MSC 203 of the completion of handover (Handoff Complete, MSONCH) at step S161, and the MSC 203s notifies the asynchronous mobile communication network 100 of the completion of handover at step S162.

Accordingly, the MSC 104 of the asynchronous mobile communication network 100 requests the release of a call with the asynchronous wireless device 420 of the mobile communication terminal 400 to the Node B/RNC (Iu Release Command) at step S171. Therefore, the asynchronous mobile communication network 100 releases the call with the asynchronous wireless device 420 at step S172, and reports the fact that the call has been released (IU Rel. Complete) to the core network at step S173, so that the handover from the asynchronous mobile communication network 100 to the synchronous mobile communication network 200 is completed.

INDUSTRIAL APPLICABILITY

In a mobile communication network in which an asynchronous mobile communication network and a synchronous mobile communication network overlap, the present invention described above causes WCDMA dummy pilot signals to be transmitted from the base stations of the synchronous mobile communication network that includes a boundary area between the asynchronous mobile communication network and the synchronous mobile communication network and, therefore, the dual band dual mode mobile communication terminal receives signals from the synchronous mobile communication network through the asynchronous wireless device while communicating with the asynchronous mobile communication network, so that power consumption attributable to the activation of a plurality of wireless devices is prevented, and uninterrupted handover between the asynchronous and synchronous mobile communication network can be accomplished.

The invention claimed is:

1. A handover method for a dual band dual mode mobile communication terminal in a mobile communication network in which an asynchronous mobile communication network and synchronous mobile communication network overlap, the terminal including an asynchronous wireless device for performing asynchronous communication with the asynchronous mobile communication network, a synchronous wireless device for performing synchronous communication with the synchronous mobile communication network, and a common module for performing control when wireless communication is performed with the synchronous and asynchronous mobile communication networks through the synchronous and asynchronous wireless devices, the handover method comprising:

the first step of the base stations of the synchronous mobile communication network transmitting dummy pilot signals for the asynchronous mobile communication network, and the mobile communication terminal, for which call connection with the asynchronous mobile communication network is performed through the asynchronous wireless device, determining whether the dummy pilot signals for the asynchronous mobile communication network, which have been transmitted from the base stations of the synchronous mobile communication network, have been received through the asynchronous wireless device;

the second step of the mobile communication terminal requesting handover to the asynchronous mobile communication network if, at the first step, it is determined that the dummy pilot signals for the asynchronous mobile communication network have been received; and the third step of the asynchronous mobile communication network determining that handover is possible, and notifying the mobile communication terminal of the determination that handover is possible, and the asynchronous mobile communication network requesting handover to the synchronous mobile communication network, thus performing handover, in response to the handover request at the second step.

2. The handover method according to claim 1, wherein the third step comprises the steps of:

the base stations of the synchronous mobile communication network performing forward channel assignment to the synchronous wireless device of the mobile communication terminal, at the request of the asynchronous mobile communication network for handover to the synchronous mobile communication network;

a Mobile Switching Center (USC) of the synchronous mobile communication network transmitting a response signal to the asynchronous mobile communication network in response to the handover request;

the asynchronous mobile communication network transmitting a handover request message, including information about channel assignment, to the asynchronous wireless device of the mobile communication terminal;

the asynchronous wireless device of the mobile communication terminal transmitting the information about channel assignment to the synchronous wireless device; performing mode change between the asynchronous wireless device and synchronous wireless device;

assigning a reverse channel between the synchronous wireless device and the synchronous mobile communication network, and performing connection after achieving synchronization; and the synchronous mobile communication system requesting the asynchronous mobile communication system to release a call with an asynchronous modem unit.

3. The handover method according to claim 2, wherein the step of performing mode change between the asynchronous wireless device and the synchronous wireless device comprises the steps of:

the synchronous wireless device starting operation through switch-on and warm-up processes;

the synchronous wireless device acquiring a pilot channel and a synchronous channel from the synchronous mobile communication network;

the synchronous wireless device entering an idle state, and the synchronous wireless device in the idle state initializing a traffic channel; and the synchronous wireless device entering a traffic state.

4. The handover method according to claim 1, wherein, at the third step, when the asynchronous mobile communication network determines that handover is possible and notifies the mobile communication terminal of the determination that handover is possible, the mobile communication terminal transmits information about the base stations of the synchronous mobile communication network to the asynchronous mobile communication network.

5. The handover method according to claim 1, wherein the dummy pilot signals for the asynchronous mobile communication network are transmitted from the base stations of the synchronous mobile communication network that includes a boundary area between the asynchronous mobile communication network and the synchronous mobile communication network.

6. A handover method for a dual band/dual mode mobile communication terminal in a mobile communication network in which an asynchronous mobile communication network and a synchronous mobile communication network overlap, the terminal including an asynchronous wireless device for performing asynchronous communication with the asynchronous mobile communication network, a synchronous wireless device for performing synchronous communication with the synchronous mobile communication network, and a common module for performing control when wireless communication is performed with the synchronous and asynchronous mobile communication networks through the synchronous and asynchronous wireless devices, the handover method comprising:

the first step of base stations of the synchronous mobile communication network, which includes a boundary area between the asynchronous mobile communication network and the synchronous mobile communication network, transmitting dummy pilot signals for the asynchronous mobile communication network;

the second step of the asynchronous mobile communication network receiving a handover request from the mobile communication terminal receiving the dummy pilot signals;

the third step of a core network of the asynchronous mobile communication network determining that handover is possible and notifying the mobile communication terminal of the determination that handover is possible in response to the handover request;

the fourth step of the asynchronous mobile communication network requesting and receiving information about the base stations of the synchronous mobile communication network with respect to the dummy pilot signals from the mobile communication terminal after the notification;

the fifth step of the asynchronous mobile communication network transmitting a handover request message, including the information about the base stations of the synchronous mobile communication network, to the synchronous mobile communication network; and the sixth step of the asynchronous mobile communication network and the synchronous mobile communication network performing handover in response to the handover request message.

7. The handover method according to claim 6, wherein the sixth step comprises the steps of:

the base stations of the synchronous mobile communication network, based on the information about the base stations of the synchronous mobile communication network, assigning a forward channel to the synchronous wireless device of the mobile communication terminal;

an MSC of the synchronous mobile communication network transmitting a response signal to the asynchronous mobile communication network in response to the handover request;

the asynchronous mobile communication network transmitting a handover request message, including information about channel assignment, to the asynchronous wireless device of the mobile communication terminal;

performing assignment of a reverse channel and synchronization on the synchronous mobile communication network and the mobile communication terminal in response to the handover request message and, thereby, performing connection; and the synchronous mobile communication network requesting asynchronous mobile communication network to release of a call with the asynchronous wireless device.

8. The handover method according to claim 7, wherein the step of performing the connection allows the asynchronous wireless device of the mobile communication terminal to transmit the information about channel assignment to the synchronous wireless device, thus performing mode change between the asynchronous wireless device and the synchronous wireless device, and achieves reverse channel assignment and synchronization between the synchronous wireless device and the synchronous mobile communication network, thus performing the communication network connection.

9. The handover method according to claim 8, wherein the mode change between the asynchronous wireless device and the synchronous wireless device comprises:

the synchronous wireless device starting operation through switch-on and warm-up processes; the synchronous wireless device acquiring a pilot channel and a synchronous channel from the synchronous mobile communication network;

the synchronous wireless device entering an idle state, and initializing a traffic channel in the idle state; and the synchronous wireless device entering a traffic state.

\* \* \* \* \*